(12) United States Patent
Sodagar (10) Patent No.: US 11,683,355 B2
(45) Date of Patent: Jun. 20, 2023

(54) METHODS AND APPARATUSES FOR DYNAMIC ADAPTIVE STREAMING OVER HTTP

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/477,288

(22) Filed: Sep. 16, 2021

(65) Prior Publication Data

US 2022/0217189 A1    Jul. 7, 2022

Related U.S. Application Data

(60) Provisional application No. 63/134,049, filed on Jan. 5, 2021.

(51) Int. Cl.
| | |
|---|---|
| *G06F 15/16* | (2006.01) |
| *H04L 65/401* | (2022.01) |
| *H04L 67/146* | (2022.01) |
| *H04L 67/02* | (2022.01) |

(52) U.S. Cl.
CPC .......... *H04L 65/401* (2022.05); *H04L 67/02* (2013.01); *H04L 67/146* (2013.01)

(58) Field of Classification Search
CPC ...... H04L 65/401; H04L 67/02; H04L 67/146
USPC ........................................... 709/231
See application file for complete search history.

(56) References Cited

U.S. PATENT DOCUMENTS

| | | | | |
|---|---|---|---|---|
| 9,451,298 | B2 * | 9/2016 | Yamagishi | H04N 21/20 |
| 10,225,319 | B2 * | 3/2019 | Ye | H04L 67/02 |
| 10,708,494 | B2 * | 7/2020 | Han | H04N 19/167 |
| 10,715,571 | B2 * | 7/2020 | Huang | H04N 21/8547 |
| 10,715,843 | B2 * | 7/2020 | Van Brandenburg | ......... |
| | | | | H04N 21/23439 |
| 11,481,026 | B2 * | 10/2022 | Chhabra | G02B 27/0172 |
| 2012/0110138 | A1 * | 5/2012 | Zhang | H04L 67/02 |
| | | | | 709/219 |

(Continued)

OTHER PUBLICATIONS

"Information technology—Dynamic adaptive streaming over HTTP (DASH)—Part 8: Session-based DASH operations," N19641, ISO/IEC, Jul. 10, 2020 (27 pages).

(Continued)

*Primary Examiner* — Moustafa M Meky
(74) *Attorney, Agent, or Firm* — Arentfox Schiff LLP (57) ABSTRACT

Aspects of the disclosure provide methods, apparatuses, and non-transitory computer-readable storage mediums for receiving media data. One apparatus includes processing circuitry that receives a media presentation description (MPD) file that includes an essential property descriptor indicating a session-based description (SBD) file. The essential property descriptor includes an attribute that indicates a class for a uniform resource locator (URL) request used for requesting a resource. The class identifies a type of the requested resource. The processing circuitry generates the URL request based on the SBD file and the class indicated in the attribute included in the essential property descriptor. The processing circuitry sends the URL request to a server to request the resource of which the type is identified based on the class of the URL request.

20 Claims, 5 Drawing Sheets

(56) References Cited

U.S. PATENT DOCUMENTS

| | | | |
|---|---|---|---|
| 2016/0219094 A1* | 7/2016 | Ye | H04L 65/65 |
| 2017/0223410 A1* | 8/2017 | Tang | H04N 21/6106 |
| 2018/0152498 A1 | 5/2018 | Luby et al. | |
| 2018/0242028 A1* | 8/2018 | Van Brandenburg | H04N 21/8456 |
| 2019/0208234 A1* | 7/2019 | Van Brandenburg | H04N 21/437 |
| 2020/0053280 A1* | 2/2020 | Han | H04N 19/164 |

OTHER PUBLICATIONS

Appendix A of "Information technology—Dynamic adaptive streaming over HTTP (DASH)—Part 8: Session-based DASH operations," N19641, ISO/IEC. Jul. 10, 2020, SC29WG11_N1941-Figure1 (2 pages).
Appendix B of "Information technology—Dynamic adaptive streaming over HTTP (DASH)—Part 8: Session-based DASH operations," N19641, ISO/IEC, Jul. 10, 2020, exampls1-timeline (2 pages).
Appendix C of "Information technology—Dynamic adaptive streaming over HTTP (DASH)—Part 8: Session-based DASH operations," N19641, ISO/IEC, Jul. 10, 2020, example2-orderline (2 pages).
Appendix D of "Information technology—Dynamic adaptive streaming over HTTP (DASH)—Part 8: Session-based DASH operations," N19641, ISO/IEC, Jul. 10, 2020, example-mpd (2 pages).
Appendix E of "Information technology—Dynamic adaptive streaming over HTTP (DASH)—Part 8: Session-based DASH operations," N19841, ISO/IEC, Jul. 10, 2020, keyvalue-schema (4 pages).
Appendix F of "Information technology—Dynamic adaptive streaming over HTTP (DASH)—Part 8: Session-based DASH operations," N19641, ISO/IEC. Jul. 10, 2020, README (2 pages).
Appendix G of "Information technology—Dynamic adaptive streaming over HTTP (DASH)—Part 8: Session-based DASH operations," N19641, ISO/IEC. Jul. 10, 2020, xml-schema (2 pages).
International Search Report dated Dec. 23, 2021 in Application No. PCT/US2021/052019 (10 pages).

* cited by examiner

METHODS AND APPARATUSES FOR DYNAMIC ADAPTIVE STREAMING OVER HTTP

INCORPORATION BY REFERENCE

The present application claims the benefit of priority to U.S. Provisional Application No. 63/134,049, "A METHOD FOR EXTENDING THE SESSION-BASED DASH OPERATIONS TO DIFFERENT URL CLASSES," filed on Jan. 5, 2021, which is incorporated by reference herein in its entirety.

TECHNICAL FIELD

The present disclosure describes embodiments generally related to methods and apparatuses for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving picture expert group (MPEG) dynamic adaptive streaming over hypertext transfer protocol (DASH) provides a standard for streaming multimedia content over IP networks. The DASH standard allows carrying event message boxes in media segments.

SUMMARY

Aspects of the disclosure provide apparatuses for receiving media data. One apparatus includes processing circuitry that receives a media presentation description (MPD) file that includes an essential property descriptor indicating a session-based description (SBD) file. The essential property descriptor includes an attribute that indicates a class for a uniform resource locator (URL) request used for requesting a resource. The class identifies a type of the requested resource. The processing circuitry generates the URL request based on the SBD file and the class indicated in the attribute included in the essential property descriptor. The processing circuitry sends the URL request to a server to request the resource of which the type is identified based on the class of the URL request.

In an embodiment, the class of the URL request indicates that the URL request is one of a media segment request, an XLink resolution request, an MPD request, a callback request that is triggered by a callback event, a chaining request for a chained-to MPD, or a fallback request for a fallback MPD.

In an embodiment, the processing circuitry selects a first key-value pair in a plurality of key-value pairs included in the SBD file and generates the URL request based on the first key-value pair.

In an embodiment, the plurality of key-value pairs is arranged in an order in the SBD file. Each of the plurality of key-value pairs has a respective order number. The SBD file includes an attribute indicating whether the selecting the first key-value pair in the plurality of key-value pairs is based on the class of the URL request.

In an embodiment, the attribute included in the SBD file indicates that the selecting the first key-value pair in the plurality of key-value pairs is based on the class of the URL request. The processing circuitry determines a second key-value pair in the plurality of key-value pairs. The second key-value pair is used for generating a previous URL request which has the same class as the URL request. The processing circuitry selects the first key-value pair in the plurality of key-value pairs based on an order number of the second key-value pair.

In an embodiment, the attribute included in the SBD file indicates that the selecting the first key-value pair in the plurality of key-value pairs is not based on the class of the URL request. The processing circuitry determines a third key-value pair in the plurality of key-value pairs, the third key-value pair being used for generating a most recent previous URL request. The processing circuitry selects the first key-value pair in the plurality of key-value pairs based on an order number of the third key-value pair.

In an embodiment, a default value of the attribute included in the essential property descriptor indicates that the class of the URL request is a media segment request class.

Aspects of the disclosure provide methods for receiving media data. The methods can include one or a combination of steps performed by the apparatuses. In one method, a media presentation description (MPD) file is received. The MPD file includes an essential property descriptor indicating a session-based description (SBD) file. The essential property descriptor includes an attribute that indicates a class for a uniform resource locator (URL) request used for requesting a resource. The class identifies a type of the requested resource. The URL request is generated based on the SBD file and the class indicated in the attribute included in the essential property descriptor. The URL request is sent to a server to request the resource of which the type is identified based on the class of the URL request.

Aspects of the disclosure also provide non-transitory computer-readable mediums storing instructions which when executed by a computer for receiving media data cause the computer to perform any one or a combination of the methods for receiving the media data.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any of the adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-Based DASH Operation and Session-Based Description (SBD)

It is noted that the MPD file can be generic for all DASH clients. In order to make the MPD file specific for a session of the DASH client, moving picture expert group (MPEG) provides session-based DASH operations. In session-based DASH operations, the DASH client can receive a side file, such as a session-based description (SBD) file, which provides instructions for the DASH client to customize the MPD file per session and possibly per client. However, in some related examples, the session-based DASH operation is application-specific. That is, for each new application, a new SBD format is required.

This disclosure includes methods for extending an SBD session to customize different classes of URLs beyond segment URLs using the SBD information.

Figure 1:
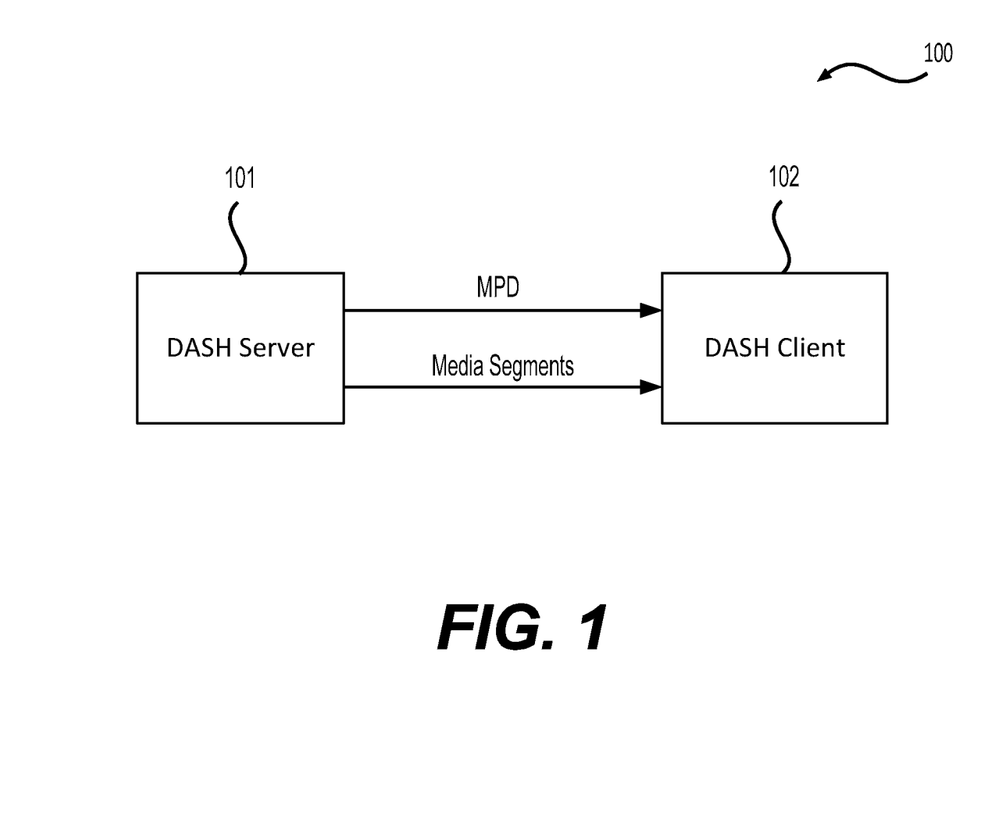
FIG. 1 shows an exemplary dynamic adaptive streaming over hypertext transfer protocol (DASH) system according to an embodiment of the disclosure.

FIG. 1 shows an exemplary DASH system (100) according to an embodiment of the disclosure. In the DASH system (100), an MPD file is sent from a DASH server (101) (e.g., a content server) to a DASH client (102). The DASH client (102) can receive media segments from the DASH server (101) based on the MPD file. The DASH client (102) can send a request to the DASH server (101) for updating the MPD file. The DASH server (101) can provide a content stream, including primary content (e.g., a main program) and one or more timed metadata tracks. In addition, the DASH client (102) can receive an SBD file from the DASH server (101) or a third party (e.g., session controller).

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific elements to segment URLs without generating unique per-session MPDS.

Figure 2:
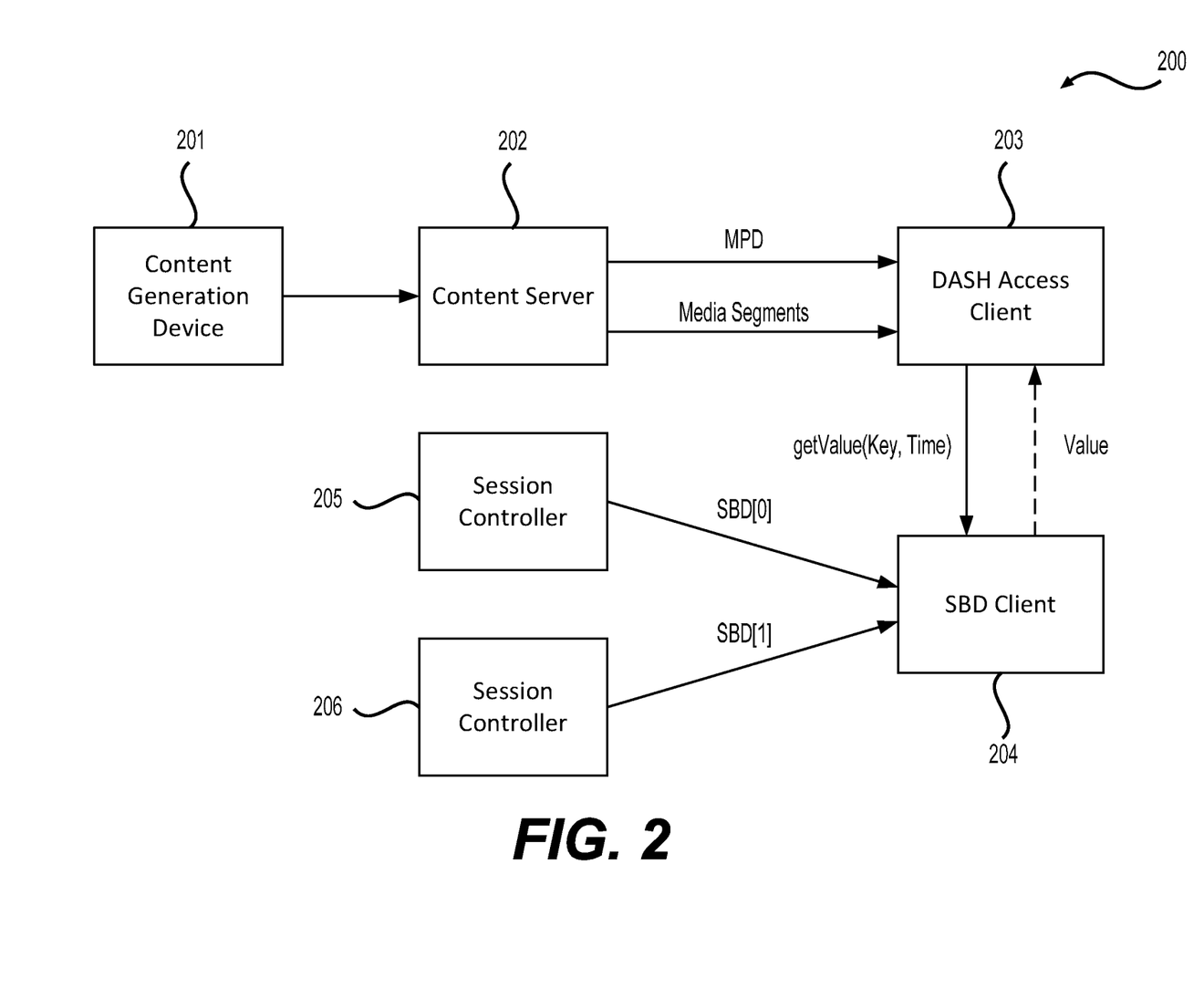
FIG. 2 shows another exemplary session-based DASH system according to an embodiment of the disclosure.

FIG. 2 shows another exemplary session-based DASH operation architecture 200 according to an embodiment of the disclosure. In the session-based DASH operation architecture 200, multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The content server (202) can receive a request from client devices, such as a DASH access client (203), for one or more media segments of the multimedia content. The multimedia content is described by an MPD file, which can be stored and updated by the content server (202) and accessed by the client devices including the DASH access client (203) to retrieve the media segments.

In order to retrieve a session-specific media segment, the DASH access client (203) can send a request to an SBD client (204) (e.g., session client) for accessing an SBD file that is received by the SBD client (204) and includes a plurality of time ranges and corresponding key-value pairs for the current session. For example, the DASH access client (203) can send a key name and a time range to the SBD client (204), which then parses the key name and the time range and returns a value corresponding to the key name and the time range to the DASH access client (203). The DASH access client (203) can include the value in a query of a segment URL which can be sent to the content server (202) for requesting the session-specific media segment when the segment request is a HTTP GET or partial GET request.

It is noted that the SBD client (204) can receive multiple SBD files from different session controllers, such as a session controller (205) and a session controller (206).

According to aspects of the disclosure, any or all of the features of the content server (202) (e.g., DASH server) can be implemented on one or more devices of a content delivery network (CDN), such as routers, bridges, proxy devices, switches, or other devices. The content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In some embodiments, the content generation device (201) and the content server (202) can be coupled by a wireless network or a wired network, or can be directly communicatively coupled.

In some embodiments, the content generation device (201) and the content server (202) can be included in a same device.

In some embodiments, the content server (202) and the session controllers (205)-(206) can be included in a same device.

In some embodiments, the content server (202) and the DASH access client (203) can be coupled by a wireless network or a wired network.

In some embodiments, the SBD client (204) and the session controllers (205)-(206) can be coupled by a wireless network or a wired network, or can be directly communicatively coupled.

In some embodiments, the DASH access client (203) and the SBD client (204) can be included in a same device.

According to aspects of the disclosure, in order to link multiple SBDs to an MPD, one or more essential property descriptors for session-based DASH can be used at an MPD level and each essential property descriptor for session-based DASH includes similar or same essential property descriptor attributes.

Figure 3:
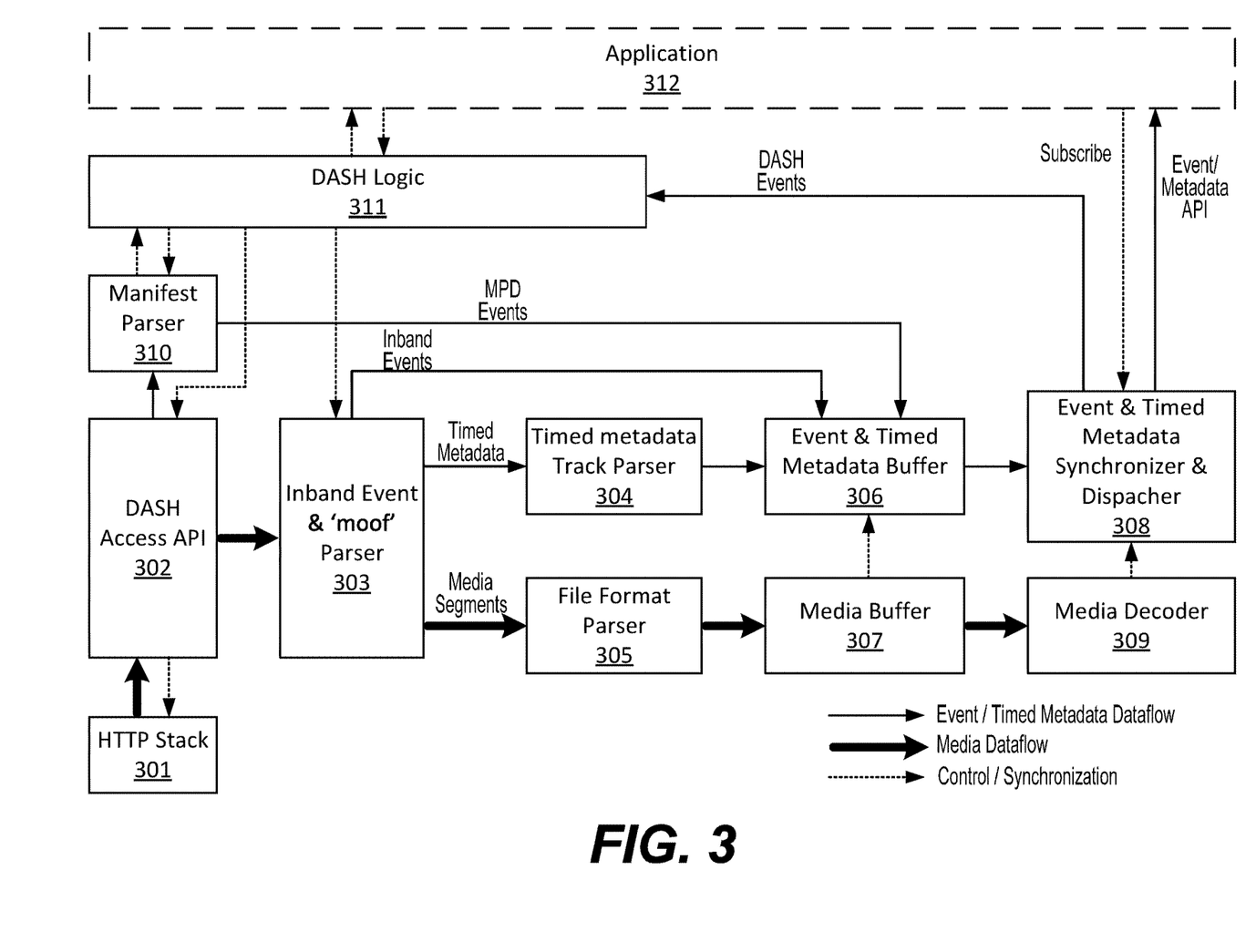
FIG. 3 shows an exemplary DASH client architecture according to an embodiment of the disclosure.

FIG. 3 shows an exemplary DASH client architecture according to an embodiment of the disclosure. The DASH client (or DASH player) can be configured to communicate with an application (312) and process various types of events, including (i) MPD events, (ii) inband events, and (iii) timed metadata events.

A manifest parser (310) can parse a manifest (e.g., an MPD). The manifest can be provided by the DASH server (101) for example. The manifest parser (310) can extract event information about MPD events, inband events, and timed metadata events embedded in timed metadata tracks. The extracted event information can be provided to a DASH logic (311) (e.g., DASH player control, selection, and heuristic logic). The DASH logic (311) can notify the application (312) of event schemes signaled in the manifest based on the event information.

The event information can include event scheme information for distinguishing between different event streams. The application (312) can use the event scheme information to subscribe to event schemes of interest. The application (312) can further indicate a desired dispatch mode for each of the subscribed schemes through one or more subscription application programming interfaces (APIs). For example, the application (312) can send a subscription request to the DASH client that identifies one or more event schemes of interest and any desired corresponding dispatch modes.

If the application (312) subscribes to one or more event schemes that are delivered as part of one or more timed metadata tracks, an inband event and 'moof' parser (303) can stream the one or more timed metadata tracks to a timed metadata track parser (304). For example, the inband event and 'moof' parser (303) parses a movie fragment box ("moof") and subsequently parses the timed metadata track based on control information from the DASH logic (311).

The timed metadata track parser (304) can extract event messages embedded in the timed metadata track. The extracted event messages can be stored in an event and timed metadata buffer (306). A synchronizer/dispatcher module (308) (e.g., event and timed metadata synchronizer and dispatcher) can dispatch (or send) the subscribed events to the application (312).

MPD events described in the MPD can be parsed by the manifest parser (310) and stored in the event and timed metadata buffer (306). For example, the manifest parser (310) parses each event stream element of the MPD, and parses each event described in each event stream element.

For each event signaled in the MPD, event information such as presentation time and event duration can be stored in the event and timed metadata buffer (306) in association with the event.

The inband event and 'moof' parser (303) can parse media segments to extract inband event messages. Any such identified inband events and associated presentation times and durations can be stored in the event and timed metadata buffer (306).

Accordingly, the event and timed metadata buffer (306) can store therein MPD events, inband events, and/or timed metadata events. The event and timed metadata buffer (306) can be a First-In-First-Out (FIFO) buffer, for example. The event and timed metadata buffer (306) can be managed in correspondence with a media buffer (307). For example, as long as a media segment exists in the media buffer (307), any events or timed metadata corresponding to that media segment can be stored in the event and timed metadata buffer (306).

A DASH Access API (302) can manage the fetching and reception of a content stream (or dataflow) including media content and various metadata through an HTTP protocol stack (201). The DASH Access API (302) can separate the received content stream into different dataflows. The dataflow provided to the inband event and 'moof' parser (303) can include media segments, one or more timed metadata tracks, and inband event signaling included in the media segments. In an embodiment, the dataflow provided to the manifest parser (310) can include an MPD.

The DASH Access API (302) can forward the manifest to the manifest parser (310). Beyond describing events, the manifest can also provide information on media segments to the DASH logic (311), which can communicate with the application (312) and the inband event and 'moof' parser (303). The application (312) can be associated with the media content processed by the DASH client. Control/synchronization signals exchanged among the application (312), the DASH logic (311), the manifest parser (310), and the DASH Access API (302) can control the fetching of media segments from the HTTP Stack (201) based on information regarding media segments provided in the manifest.

The inband event and 'moof' parser (303) can parse a media dataflow into media segments including media content, timed metadata in a timed metadata track, and any signaled inband events in the media segments. The media segments including media content can be parsed by a file format parser (305) and stored in the media buffer (307).

The events stored in the event and timed metadata buffer (306) can allow the synchronizer/dispatcher (308) to communicate to the application (312) the available events (or events of interest) related to the application (312) through an event/metadata API. The application (312) can be configured to process the available events (e.g., MPD events, inband events, or timed metadata events) and subscribe to particular events or timed metadata by notifying the synchronizer/dispatcher (308). Any events stored in the event and timed metadata buffer (306) that are not related to the application (312), but are instead related to the DASH client itself can be forwarded by the synchronizer/dispatcher (308) to the DASH logic (311) for further processing.

In response to the application (312) subscribing to particular events, the synchronizer/dispatcher (308) can communicate to the application (312) event instances (or timed metadata samples) corresponding to event schemes to which the application (312) has subscribed. The event instances can be communicated in accordance with a dispatch mode indicated by the subscription request (e.g., for a specific event scheme) or a default dispatch mode. For example, in an on-receive dispatch mode, event instances may be sent to the application (312) upon receipt in the event and timed metadata buffer (306). On the other hand, in an on-start dispatch mode, event instances may be sent to the application (312) at their associated presentation time, for example in synchronization with timing signals from the media decoder (309).

It is noted that, in the DASH client architecture, the thick dataflow lines indicate media dataflow, the narrow dataflow lines indicate even and timed metadata dataflow, and the dash dataflow lines indicates control and synchronization. In addition, the same processing model can be used for CMAF events.

III. Signaling of a URL Class for a URL

Session-based DASH operation is an important approach to customize an MPD per session and possibly per client. However, in some related examples, only segment request URLs can be allowed to be customized in an SBD session.

This disclosure includes methods of extending the SBD session to customize different classes of URLs beyond the segment request URLs using the SBD information.

According to aspects of the disclosure, the classes of the URL to be customized can be generalized or extended from the SBD operations (query or URL customization or both) to different classes of URL requests other than segment requests.

Therefore, the SBD operations can be allowed to be applied to one or more of the following classes of URL requests: (i) segment requests; (ii) extensible markup language linking language (XLink) resolution requests; (iii) MPD requests; (iv) all requests triggered by DASH callback events; (v) all requests for chained-to MPDs; and (vi) all requests for the fallback MPDs.

Each URL class can define one or more URLs that are used by the DASH client to request resources with the same purpose such as segments, XLink resolutions, and the like.

DASH callback events are indications in the content that it is expected by a DASH Client to issue an HTTP GET request to a given URL and ignore the HTTP response. A content author may use such an event for tracking play-back of specific content on a server that is not included in the media path.

MPD chaining provides a mechanism to indicate that, at the end of one media presentation, a new media presentation starts. The end may be a regular end, or an early termination due to an error condition. In order to enable this mechanism, the "chained-from" MPD may include an essential or supplemental descriptor which points to the "chained-to" MPD location.

MPD chaining can include two cases: a regular chaining and a fallback chaining. The regular chaining refers to an operation in which the "chained-to" MPD is played at the end of the "chained-from" MPD. The fallback chaining refers to an operation in which the "chained-to" MPD is only played when the "chained-from" MPD is terminated early due to error conditions.

According to aspects of the disclosure, a URL class for a URL can be indicated in an essential property descriptor included in an MPD file. The essential property descriptor is used for a session-based DASH operation and indicates an SBD file for an SBD session. Note that presentation descriptor can be either an essential property descriptor or a supplemental property descriptor. For an essential property, the media presentation author expresses that the successful processing of the descriptor is essential to properly use the information in the parent element that contains this descriptor unless the element shares the same @id with another EssentialProperty element. By contrast, for a supplemental property, the media presentation author expresses that the descriptor contains supplemental information that may be used by the DASH Client for optimized processing.

Table 1 shows an exemplary essential property descriptor that includes an attribute to specify applicable URL classes.

In Table, an attribute @urlClass can specify which URL class shall be subject to the SBD processing. Different values of the attribute @urlClass can indicate different allowed URL classes. For example, a value "xlink" for the attribute @urlClass indicates that the class of the URL is an XLink resolution request. A default value of the attribute @urlClass is "segment", which indicates that the class of the URL is a media segment request.

TABLE 1

| Element or Attribute Name | Use | Description |
| --- | --- | --- |
| EssentialProperty | | instantiation of EssentialProperty (defined in ISO/IEC 23009-1) for session-based DASH operations |
| @schemeIdUri | M (string) | shall be set to "urn:mpeg:dash:sbd:2020". |
| @value | M (string) | URL of the SBD document for this session |
| @urlClass | OD (default: "segment") | specifies which HTTP GET requests shall be the subject to SBD processing. Value is a white spaced concatenated list of the following keys:<br>1) "segment" (all segment requests)",<br>2) "xlink" (all XLink resolution requests),<br>3) "mpd" (all MPD requests),<br>4) "callback" (all requests triggered by DASH callback events),<br>5) "chaining" (requests for chained-to 1VIPDs,<br>6) "fallback" (requests for the alternative 1VIPDs.<br>Each key defines an URL class. Each URL class defines a collocation of URLs that its members are used to request a different class of resources, such as the class of segments, class of Xlink resolutions, etc.<br>Default value is "segment", i.e. only segment URLs are subject to SBD processing. |
| @template | O | template for applying to the key-value pair found in SBD document. When the value of a Key@name in the @template is found in the SBD document, its corresponding key-value pair of SBD document shall replace the string between unescaped '$' characters in the @template.<br>The @template value shall have no whitespace characters.<br>If absent, Key@name and its corresponding value in the SBD document, separated by '=', shall be added to the end of the query, where each consecutive key-value pairs are separated by '&'.<br>The order of key-value pairs in the query is defined by the order of Key elements in this descriptor. |
| @hostTemplate | O | host template for applying to the value found in SBD document. When the value of a UrlKey@hostinfo in the @hostTemplate is found in the SBD document, its corresponding value of SBD document shall replace the string between unescaped '$' characters in the @hostTemplate, and the URL's host is replaced with the result.<br>The @hostTemplate value shall have no whitespace characters. |
| @portTemplate | O | port template for applying to the value pair found in SBD document. When the value of a UrlKey@port in the @portTemplate is found in the SBD document, its corresponding value of SBD document shall replace the string between unescaped '$' characters in the @portTemplate, and the URL's port is replaced with the result.<br>The @portoTemplate value shall have no whitespace characters. |
| @pathTemplate | O | path template for applying to the value pair found in SBD document. When the value of a UrlKey@path in the @pathTemplate is found in the SBD document, its corresponding value of SBD document shall replace the string between unescaped '$' characters in the @pathTemplate, and the URL's path is replaced with the result.<br>The @portoTemplate value shall have no whitespace characters. |

TABLE 1-continued

| Element or Attribute Name | Use | Description |
| --- | --- | --- |
| Key | 1 ... N | a key name to be found in SBD document and its default value.<br>If absent, all keys and corresponding values in the corresponding keyList of the SBD document shall be added to the (sub)segment request URL query. |
| @name | M | Name of the key of the SBD document to be added to the queries for this session after processing described by @template. This value shall be a string without whitespaces, start with a letter, and contain only unreserved characters per RFC 3986. If @name value does not appear in the keyList of SBD document, the @name value-@defaultValue value pair shall be used in the template or in the absence of the template. |
| @defaultValue | OD ('null') | default value in key-value pair if @name value not found in SBD document or if there is no value defined for a requested time range or segment number in the SBD document. |
| UrlKey | 0 ... 1 | a set of URL keys to be found in SBD document and its default value. |
| @host | O | URI host key for SBD processing. This value shall be a string without whitespaces, start with a letter, and contain only unreserved characters per RFC 3986. |
| @port | O | URI port key SBD processing. This value shall be a string without whitespaces, start with a letter, and contain only unreserved characters per RFC 3986. |
| @path | O | URI path key SBD processing. This value shall be a string without whitespaces, start with a letter, and contain only unreserved characters per RFC 3986. |

Legend:
For attributes: M = Mandatory, O = Optional, OD = Optional with Default Value, CM = Conditionally Mandatory.
For elements: <minOccurs> ... <maxOccurs> (N = unbounded)
Elements are bold; attributes are non-bold and preceded with an @.

According to aspects of the disclosure, the SBD file can have two models for its timeline: time-based and order-based. Each SBD file can use either the time-based or the order-based timeline and not both. The order-based timeline is also referred to as orderline. An SBD client can perform the SBD processing based on the timeline or orderline of the SBD file.

In the case of the time-based timeline, a time range can be used to identify one of a plurality of key-value pairs included in the SBD file. Therefore, when the SBD client processes a URL request, a URL class of the URL request does not have any impact on the URL request processing. That is, mixing various URL classes does not have any impact on the URL processing performed by the SBD client.

However, in the case of the order-based timeline, an order number is used to identify one of the plurality of key-value pairs included in the SBD file. The order number of the one of the plurality of key-value pairs may depend on the URL class of the URL request. Therefore, there can be two scenarios for the SBD processing of the URL request.

In a first scenario, which can be referred to as distinct URL class processing, the URL can be processed based on the URL class of the URL. The SBD processing only advances the orderline (order-based timeline) for the URLs belonging to the same class and not the other classes. In an embodiment, each URL class can correspond to a separate virtual pointer pointing to a key-value pair for the respective URL class. For example, the media segment URL class can have a first virtual pointer that points to a first key-value pair used for a first previous URL class belonging to the media segment URL class, and the XLink resolution URL class can have a second virtual pointer that points to a second key-value pair used for a second previous URL class belonging to the XLink resolution URL class. If the current URL class belongs to the media segment URL class, the first virtual pointer moves to a third key-value pair next to the first key-value pair according to the orderline, and the third key-value pair pointed by the first virtual pointer can be used for the current URL class. If the current URL class belongs to the XLink resolution URL class, the second virtual pointer moves to a fourth key-value pair next to the second key-value pair according to the orderline, and the fourth key-value pair pointed by the second virtual pointer can be used for the current URL class. In this way, therefore, the SBD processing of the current URL has no impact on the SBD processing of a next URL if the next URL is from a class different from the current URL.

In a second scenario, which can be referred to as collective URL class processing, the URL can be processed in an order regardless of the URL class of the URL. In an embodiment, all URL classes can share a same virtual pointer pointing to a key-value pair for a most recent previous URL. For example, if one key-value pair is used for the most recent previous URL, another key-value pair next to the one key-value pair according to the orderline can be used for the current URL, no matter whether the current URL and the most recent previous URL belong to the same URL class. In this way, therefore, the SBD processing of the current URL may change the results of the SBD processing of the next URL regardless of the URL class of the next URL. This is due to an advancement of the order-based timeline for each URL processing without the URL class consideration.

Table 2 shows an exemplary orderline model including an attribute indicating a distinct or collective processing for the SBD processing. In Table 2, when the attribute collective is set to be "true", the URL can be processed based on the collective URL class processing. When the attribute collective is set to be "false", the URL can be processed based on the distinct URL class processing. A default value for the attribute collective is set to be "false".

TABLE 2

| Element or Attribute Name | Use | Description |
| --- | --- | --- |
| v | CM (array of string) | list of values in order matching their names in keylist, separated by white space. The default value is specified in Key@defaultValue attribute. Eac value shall contain only unrestricted characters per RFC 3986 Section 2.2. Namely, the permitted characters are uppercase and lowercase letters, decimal digits, hyphen, period, underscore, and tilde. |
| n | O (integer) | starting number of the (sub)segment to which the value applies, i.e., for "n":"5", the first 4 (sub)segments are skipped and the fifth (sub)segment is the starting (sub)segment. If absent, the starting (sub)segment is the first (sub)segment in corresponding MPD or Period element, depending on which element the SBD descriptor is included. Only one of s or n attributes may be present, but not both. |
| r | O (integer) | number of additional (sub)segments in this O element using the key-value pairs, e.g. "r":"1", two (sub)segments are using the key-value pairs of this element. If not present, only one (sub)segment in this element is using the key-value pairs defined in this element. |
| collective | OD (boolean) Default: 'false' | if "true", with the processing of each URL, regardless of its class, the orderline is advanced. If "false", the order line is applied to each URL class separately, e.g., an SBD processing of a URL from one URL class does not have any impact on an SBD processing of a next URL if the next URL is from a different URL class. |

Legend:
M = Mandatory, O = Optional OD = Optional with Default Value, CM = Conditionally Mandatory.
JSON: objects are bold; name-value pairs are non-bold.

According to aspects of the disclosure, a method of extending an SBD processing to different classes of URL requests other than segment requests is provided. In the method, the extended classes can include segment requests, XLink resolution requests, MPD requests, requests triggered by DASH callback events, requests for chained-to MPDs, and requests for the fallback MPDs. One or more URL classes can be signaled in a manifest such as an essential property descriptor included in an MPD file so that an SBD client can apply the SBD processing to the URLs belonging to these classes. The SBD processing includes a URL customization and adding URL queries.

According to aspects of the disclosure, a first method for orderline processing of URL classes is provided. In the first method, every received URL can be processed using an orderline table. The table can be advanced to a next entry regardless of the URL class. The first method of processing can be signaled using a flag such as an attribute in an SBD file.

According to aspects of the disclosure, a second method for orderline processing of URL classes is provided. In the second method, every received URL of a distinct class can be processed using an orderline table separated from other classes. The table can be advanced to a next entry only for the received URLs belonging to the same class (and not for other classes). The second method of processing can be signaled using a flag such as an attribute in an SBD file.

IV. Flowchart

Figure 4:
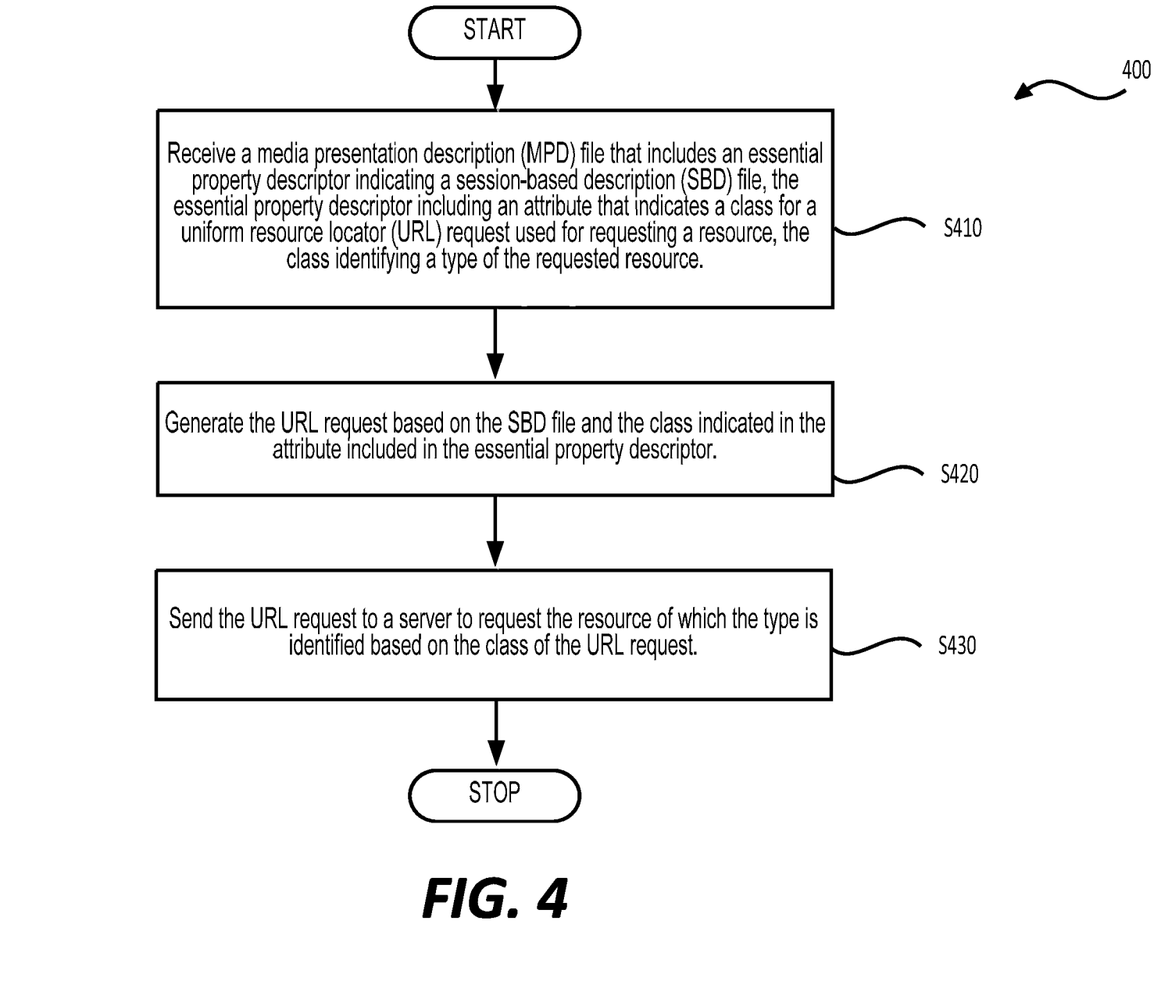
FIG. 4 shows a flow chart outlining a process example in accordance with some embodiments.

FIG. 4 shows a flow chart outlining a process (400) according to an embodiment of the disclosure. In various embodiments, the process (400) is executed by processing circuitry, such as the processing circuitry in the DASH client (102). In some embodiments, the process (400) is implemented in software instructions, thus when the processing circuitry executes the software instructions, the processing circuitry performs the process (400). The process (400) starts at (S410), where the process (400) receives an MPD file that includes an essential property descriptor indicating an SBD file. The essential property descriptor includes an attribute that indicates a class for a URL request used for requesting a resource. The class identifies a type of the requested resource. Then, the process (400) proceeds to step (S420).

At step (S420), the process (400) generates the URL request based on the SBD file and the class indicated in the attribute included in the essential property descriptor. Then, the process (400) proceeds to step (S430).

At step (S430), the process (400) sends the URL request to a server to request the resource of a type identified by the class of the URL request. Then, the process (400) terminates.

In an embodiment, the class of the URL request indicates that the type of URL request is one of a media segment request, an XLink resolution request, an MPD request, a callback request that is triggered by a callback event, a chaining request for a chained-to MPD, or a fallback request for a fallback MPD.

In an embodiment, the process (400) selects a first key-value pair in a plurality of key-value pairs included in the SBD file and generates the URL request based on the first key-value pair.

In an embodiment, the plurality of key-value pairs is arranged in an order in the SBD file. Each of the plurality of key-value pairs has a respective order number. The SBD file includes an attribute indicating whether the selecting the first key-value pair in the plurality of key-value pairs is based on the class of the URL request.

In an embodiment, the attribute included in the SBD file indicates that the selecting the first key-value pair in the plurality of key-value pairs is based on the class of the URL request. The process (400) determines a second key-value pair in the plurality of key-value pairs. The second key-value pair is used for generating a previous URL request which has the same class as the URL request. The process (400) selects the first key-value pair in the plurality of key-value pairs based on an order number of the second key-value pair.

In an embodiment, the attribute included in the SBD file indicates that the selecting the first key-value pair in the plurality of key-value pairs is not based on the class of the URL request. The process (400) determines a third key-value pair in the plurality of key-value pairs, the third key-value pair being used for generating a most recent previous URL request. The process (400) selects the first key-value pair in the plurality of key-value pairs based on an order number of the third key-value pair.

In an embodiment, a default value of the attribute included in the essential property descriptor indicates that the class of the URL request is a media segment request class.

V. Computer System

The techniques described above, can be implemented as computer software using computer-readable instructions and physically stored in one or more computer-readable media. For example, FIG. 5 shows a computer system (500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
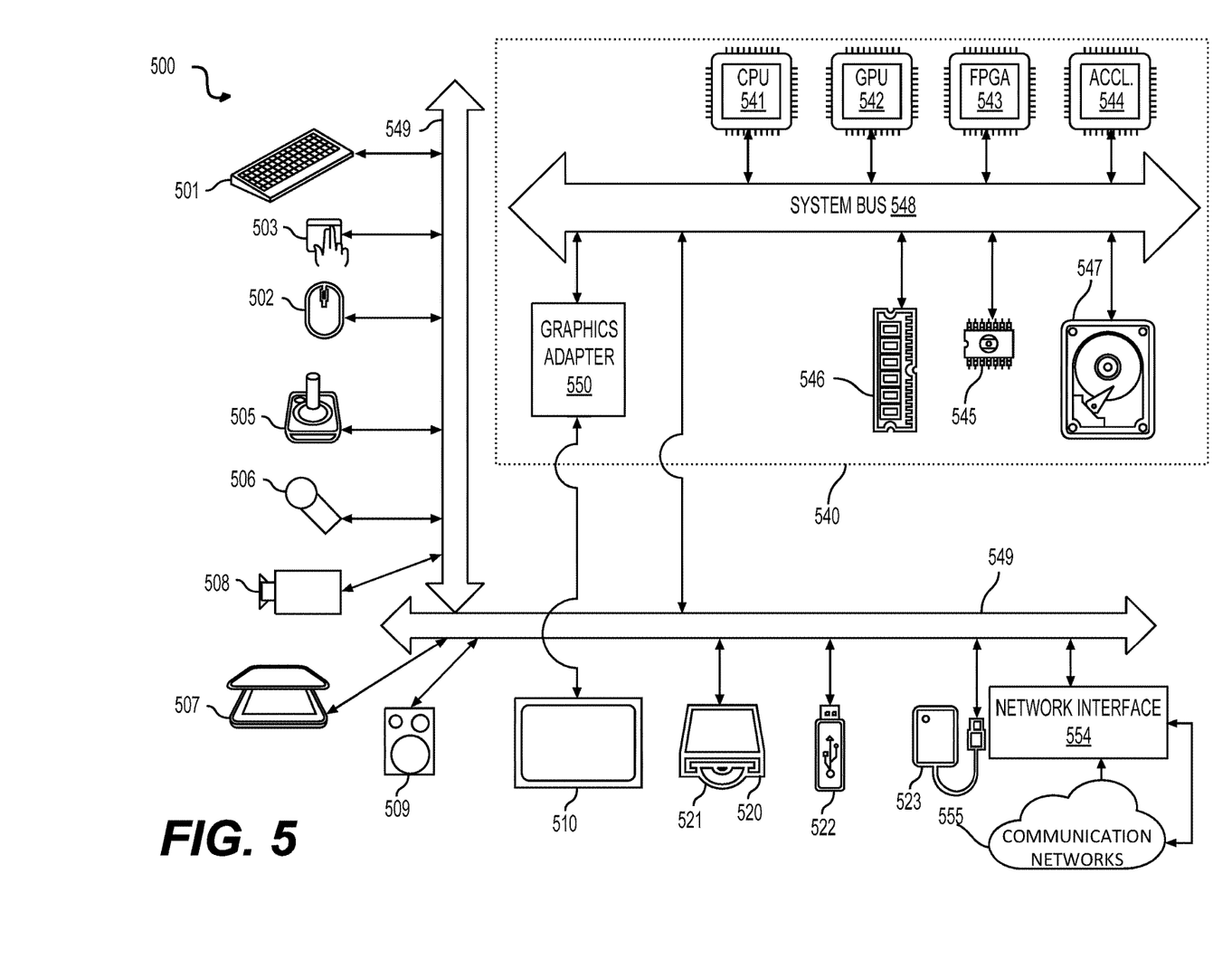
FIG. 5 is a schematic illustration of a computer system in accordance with an embodiment.

The components shown in FIG. 5 for computer system (500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (500).

Computer system (500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (501), mouse (502), trackpad (503), touch screen (510), data-glove (not shown), joystick (505), microphone (506), scanner (507), and camera (508).

Computer system (500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (510), data-glove (not shown), or joystick (505), but there can also be tactile feedback devices that do not serve as input devices), audio output devices (such as: speakers (509), headphones (not depicted)), visual output devices (such as screens (510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (510)) can be connected to a system bus (548) through a graphics adapter (550).

Computer system (500) can also include human accessible storage devices and their associated media such as optical media including CD/DVD ROM/RW (520) with CD/DVD or the like media (521), thumb-drive (522), removable hard drive or solid state drive (523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (500) can also include a network interface (554) to one or more communication networks (555). The one or more communication networks (555) can for example be wireless, wireline, optical. The one or more communication networks (555) can further be local, wide-area, metropolitan, vehicular and industrial, real-time, delay-tolerant, and so on. Examples of the one or more communication networks (555) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (549) (such as, for example USB ports of the computer system (500)); others are commonly integrated into the core of the computer system (500) by attachment to a system bus as described below (for example Ethernet interface into a PC computer system or cellular network interface into a smartphone computer system). Using any of these networks, computer system (500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (540) of the computer system (500).

The core (540) can include one or more Central Processing Units (CPU) (541), Graphics Processing Units (GPU)

(542), specialized programmable processing units in the form of Field Programmable Gate Areas (FPGA) (543), hardware accelerators for certain tasks (544), and so forth. These devices, along with Read-only memory (ROM) (545), Random-access memory (546), internal mass storage such as internal non-user accessible hard drives, SSDs, and the like (547), may be connected through the system bus (548). In some computer systems, the system bus (548) can be accessible in the form of one or more physical plugs to enable extensions by additional CPUs, GPU, and the like. The peripheral devices can be attached either directly to the core's system bus (548), or through a peripheral bus (549). Architectures for a peripheral bus include PCI, USB, and the like.

CPUs (541), GPUs (542), FPGAs (543), and accelerators (544) can execute certain instructions that, in combination, can make up the aforementioned computer code. That computer code can be stored in ROM (545) or RAM (546). Transitional data can also be stored in RAM (546), whereas permanent data can be stored for example, in the internal mass storage (547). Fast storage and retrieve to any of the memory devices can be enabled through the use of cache memory, that can be closely associated with one or more CPU (541), GPU (542), mass storage (547), ROM (545), RAM (546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (500) and specifically the core (540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (540) that are of non-transitory nature, such as core-internal mass storage (547) or ROM (545). The software implementing various embodiments of the present disclosure can be stored in such devices and executed by core (540). A computer-readable medium can include one or more memory devices or chips, according to particular needs. The software can cause the core (540) and specifically the processors therein (including CPU, GPU, FPGA, and the like) to execute particular processes or particular parts of particular processes described herein, including defining data structures stored in RAM (546) and modifying such data structures according to the processes defined by the software. In addition or as an alternative, the computer system can provide functionality as a result of logic hard-wired or otherwise embodied in a circuit (for example: accelerator (544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of receiving media data, the method comprising:
    receiving a media presentation description (MPD) file that includes an essential property descriptor indicating a session-based description (SBD) file, the essential property descriptor including a uniform resource locator (URL) class attribute that indicates which class of URL request of a plurality of classes of URL requests is to be used for requesting a resource, each of the classes identifying a different type of requested resource;
    generating the URL request based on the SBD file and the class indicated in the URL class attribute included in the essential property descriptor; and
    sending the URL request to a server to request the resource of which the type of the requested resource is identified based on the class of the URL request.

2. The method of claim 1, wherein the class of the URL request indicates that the URL request is one of a media segment request, an extensible markup language linking language (XLink) resolution request, an MPD request, a callback request that is triggered by a callback event, a chaining request for a chained-to MPD, or a fallback request for a fallback MPD.

3. The method of claim 1, wherein the generating includes:
    selecting a first key-value pair in a plurality of key-value pairs included in the SBD file; and
    generating the URL request based on the first key-value pair.

4. The method of claim 3, wherein the plurality of key-value pairs is arranged in an order in the SBD file, each of the plurality of key-value pairs has a respective order number, and the SBD file includes an attribute indicating whether the selecting the first key-value pair in the plurality of key-value pairs is based on the class of the URL request.

5. The method of claim 4, wherein the attribute included in the SBD file indicates that the selecting the first key-value pair in the plurality of key-value pairs is based on the class of the URL request, and the selecting includes:
    determining a second key-value pair in the plurality of key-value pairs, the second key-value pair being used for generating a previous URL request which has the same class as the URL request; and
    selecting the first key-value pair in the plurality of key-value pairs based on an order number of the second key-value pair.

6. The method of claim 4, wherein the attribute included in the SBD file indicates that the selecting the first key-value pair in the plurality of key-value pairs is not based on the class of the URL request, and the selecting includes:
    determining a third key-value pair in the plurality of key-value pairs, the third key-value pair being used for generating a most recent previous URL request; and
    selecting the first key-value pair in the plurality of key-value pairs based on an order number of the third key-value pair.

7. The method of claim 1, wherein a default value of the URL class attribute included in the essential property descriptor indicates that the class of the URL request is a media segment request class.

8. An apparatus for receiving media data, the apparatus comprising:
processing circuitry configured to:
receive a media presentation description (MPD) file that includes an essential property descriptor indicating a session-based description (SBD) file, the essential property descriptor including a uniform resource locator (URL) class attribute that indicates which class of URL request of a plurality of classes of URL requests is to be used for requesting a resource, each of the classes identifying a different type of requested resource;
generate the URL request based on the SBD file and the class indicated in the URL class attribute included in the essential property descriptor; and
send the URL request to a server to request the resource of which the type of the requested resource is identified based on the class of the URL request.

9. The apparatus of claim 8, wherein the class of the URL request indicates that the URL request is one of a media segment request, an extensible markup language linking language (XLink) resolution request, an MPD request, a callback request that is triggered by a callback event, a chaining request for a chained-to MPD, or a fallback request for a fallback MPD.

10. The apparatus of claim 8, wherein the processing circuitry is further configured to:
select a first key-value pair in a plurality of key-value pairs included in the SBD file; and
generate the URL request based on the first key-value pair.

11. The apparatus of claim 10, wherein the plurality of key-value pairs is arranged in an order in the SBD file, each of the plurality of key-value pairs has a respective order number, and the SBD file includes an attribute indicating whether the selecting the first key-value pair in the plurality of key-value pairs is based on the class of the URL request.

12. The apparatus of claim 11, wherein the attribute included in the SBD file indicates that the selecting the first key-value pair in the plurality of key-value pairs is based on the class of the URL request, and the processing circuitry is further configured to:
determine a second key-value pair in the plurality of key-value pairs, the second key-value pair being used for generating a previous URL request which has the same class as the URL request; and
select the first key-value pair in the plurality of key-value pairs based on an order number of the second key-value pair.

13. The apparatus of claim 11, wherein the attribute included in the SBD file indicates that the selecting the first key-value pair in the plurality of key-value pairs is not based on the class of the URL request, and the processing circuitry is further configured to:
determine a third key-value pair in the plurality of key-value pairs, the third key-value pair being used for generating a most recent previous URL request; and
select the first key-value pair in the plurality of key-value pairs based on an order number of the third key-value pair.

14. The apparatus of claim 8, wherein a default value of the URL class attribute included in the essential property descriptor indicates that the class of the URL request is a media segment request class.

15. A non-transitory computer-readable storage medium storing instructions which, when executed by a computer for receiving media data, cause the computer to perform:
receiving a media presentation description (MPD) file that includes an essential property descriptor indicating a session-based description (SBD) file, the essential property descriptor including a uniform resource locator (URL) class attribute that indicates which class of URL request of a plurality of classes of URL requests is to be used for requesting a resource, each of the classes identifying a different type of requested resource;
generating the URL request based on the SBD file and the class indicated in the URL class attribute included in the essential property descriptor; and
sending the URL request to a server to request the resource of which the type of the requested resource is identified based on the class of the URL request.

16. The non-transitory computer-readable storage medium of claim 15, wherein the class of the URL request indicates that the URL request is one of a media segment request, an extensible markup language linking language (XLink) resolution request, an MPD request, a callback request that is triggered by a callback event, a chaining request for a chained-to MPD, or a fallback request for a fallback MPD.

17. The non-transitory computer-readable storage medium of claim 15, wherein the stored instructions cause the computer to perform:
selecting a first key-value pair in a plurality of key-value pairs included in the SBD file; and
generating the URL request based on the first key-value pair.

18. The non-transitory computer-readable storage medium of claim 17, wherein the plurality of key-value pairs is arranged in an order in the SBD file, each of the plurality of key-value pairs has a respective order number, and the SBD file includes an attribute indicating whether the selecting the first key-value pair in the plurality of key-value pairs is based on the class of the URL request.

19. The non-transitory computer-readable storage medium of claim 18, wherein the attribute included in the SBD file indicates that the selecting the first key-value pair in the plurality of key-value pairs is based on the class of the URL request, and the stored instructions cause the computer to perform:
determining a second key-value pair in the plurality of key-value pairs, the second key-value pair being used for generating a previous URL request which has the same class as the URL request; and
selecting the first key-value pair in the plurality of key-value pairs based on an order number of the second key-value pair.

20. The non-transitory computer-readable storage medium of claim 18, wherein the attribute included in the SBD file indicates that the selecting the first key-value pair in the plurality of key-value pairs is not based on the class of the URL request, and the stored instructions cause the computer to perform:
determining a third key-value pair in the plurality of key-value pairs, the third key-value pair being used for generating a most recent previous URL request; and
selecting the first key-value pair in the plurality of key-value pairs based on an order number of the third key-value pair.

* * * * *